United States Patent [19]

Mustafa et al.

[11] Patent Number: 5,339,734
[45] Date of Patent: Aug. 23, 1994

[54] PERSONAL BARCODER

[76] Inventors: Reynaldo A. Mustafa, 697 Lloyd Rd., Aberdeen, N.J. 07747-1351 18; James Kinstrey, 1036 Broadway, West Long Branch, N.J. 07764-1308

[21] Appl. No.: 91,586

[22] Filed: Jul. 13, 1993

Related U.S. Application Data

[63] Continuation-in-part of Ser. No. 898,705, Jun. 15, 1992, Pat. No. 5,237,919.

[51] Int. Cl.$^5$ .................................................. B41J 1/60
[52] U.S. Cl. ................................. 101/109; 101/103
[58] Field of Search .............. 101/103, 104, 105, 109, 101/110, 111, 112

[56] References Cited

U.S. PATENT DOCUMENTS

| | | | |
|---|---|---|---|
| 858,619 | 7/1907 | O'Farrell | 101/111 |
| 3,236,177 | 2/1966 | Perry et al. | 101/109 |
| 3,355,016 | 11/1967 | Prince | 101/111 |

*Primary Examiner*—Edgar S. Burr
*Assistant Examiner*—Ren Yan

[57] ABSTRACT

This invention describes a hand-held unit incorporating a plurality of character carrying members in the form of continuous bands or strips which can be mechanically adjusted, as desired, to display a series of desired analog numbers at the first location and to produce a bar code representation thereof at a second location. Such continuous bands or strip allow a user to apply an imprint of the bar code representation produced directly to a document—for example, as a bar code representation of a Postal Service Zip-Code destination to a piece of mail. A plurality of tabbed strips are disposed for actuation to display the analog numbers on the continuous bands and to bring the bar code representation into position. Each of the continuous bands has a plurality of tabs to allow for the movement of the individual strips within the slotted body of the device.

1 Claim, 5 Drawing Sheets

PERSONAL BARCODER

This application is based on Disclosure Document No.'s 292,430 and 328,291; filed on Sep. 30, 1991 and Mar. 29, 1993 respectively; and is a continuation in part of patent application Ser. No. 07/898.705, filed Jun. 15, 1992, now U.S. Pat. No. 5,237,919.

FIELD OF THE INVENTION

This invention relates to bar codes in general and to an inexpensive, hand-held unit for use in the personal bar coding of mail, in particular.

BACKGROUND OF THE INVENTION

As is well known and understood, bar codes are used by the United States Postal Service and other mail carriers in an attempt to speed up the processing of mail delivery and to reduce labor expense. As is also well known and understood, these bar codes are typically sprayed onto the mail documentation by such expensive equipment as optical character readers which first read the addresses electronically, and then converts the address into machine readable codes for further processing.

However, and as has been widely publicized, the equipment employed in such sophisticated optical-scanning technology and computer-based artificial intelligence systems experience great difficulty in deciphering street names, numbers and Zip-Codes written in pencil or pen. As has also been highly publicized, this is particularly a problem where the information is handwritten. In such instances—amounting to upwards of 30-40 percent of United States Postal Service delivery—, in order to process the mail the bar code is affixed to speed delivery; obviously, this represents both a tedious and costly task.

In an attempt to combat this, much effort has been devoted to analyzing thousands of handwritten and printing styles, to try to determine quirks and commonalities that computers can be taught to identify and interpret. As has been reported in the print media, researchers have demonstrated experimental systems that can discern enough information from a handwritten envelope to meet the needs of automated letter-sorting equipment—but these equipments have been determined to take a far longer period of time to read the address than the Postal Services desired speed of some 13 pieces of mail per second for its automated sorting machines.

As has also been widely advertised, it is the present desire of the United States Postal Service to have bar codes on all mail by the year 1995, so as to have the coding mail system completely operative by then. In view of that, much sophisticated information-technology and government-contracting corporations are proposing systems to obtain address-recognition contracts to replace or supplement the automated scanning and sorting equipment currently being used. When one factors in that such "handwritten recognition" could also be useful in the banking, credit card and/or other industries, in which large volumes of handwritten documents jam-up computer processing, it is not too hard to understand all the engineering time and effort being invested.

However, equally apparent is the lack of attention which the Postal Service has devoted to easing this problem at the "sending end," where the documents are being addressed. While admittedly, the present Postal operation gives a premium of 2 cents or more for every piece of first-class mail that is already addressed with a bar code, that fact has not been very-well publicized. In fact, by-and-large, the Postal Service has come to a seeming conclusion that nothing it can do can bring the "sending public", into the equation of facilitating the mail delivery by typewriting the envelope so that its address can be computer recognized, or by having envelopes already pre-printed with bar code destinations, as have been employed by public utility companies, credit card companies and insurance companies in processing their already addressed coupons to be returned by a consumer along with its monthly or periodic payment.

SUMMARY OF THE INVENTION

As will become clear from the description that follows, the present invention describes a hand-held unit, to be employed by an average household family or small company to automate its own mail delivery prior to entering the typical forwarding process, and so that it, as well as everyone else, could benefit from the Postal Service automation. As will be appreciated, the invention will be seen to provide the general public with a simple, inexpensive method of speeding up their mail—while at the same time benefiting from Postal Service premium reductions, as well as implicitly from the reduction of labor costs that follow as automation takes greater hold. As will further be seen, the invention allows the general public and the small business person, to fix a bar code on any piece of mail before it enters the delivery stream from sender to recipient.

More specifically, the hand-held unit of the invention is in the nature of a personal barcoder, which incorporates a plurality of character carrying bands or strips which can be mechanically adjusted to display a series of desired analog numbers—as a Postal Service Zip-code, for example—at a first location, and to produce a bar code representation thereof at a second location. Such character bands or strips, according to the invention, are constructed sturdy enough so as to allow the user to apply an imprint of the bar code representation directly to the document, as programmed in by the sender.

As will be further described, a first embodiment of the invention employs a plurality of thumb wheel units that may be actuated to display the analog number through a window, and which automatically brings into play a bar code representation at a second position to imprint that corresponding bar code representation. In a second embodiment of the invention, a plurality of tabs may be actuated to slide the strip into position, to display the analog number, and to position once again, the corresponding bar code representation for imprintation. As will be appreciated by those skilled int the art, the hand-held unit may thus be characterized to a conventional date or similar "stamper", and in such respect, the hand-held unit of the invention may be equipped with these character carrying bands or strips pre-inked in any known manner so as to print the bar code representation as an impression —or may be utilized with a readily available stamp pad.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
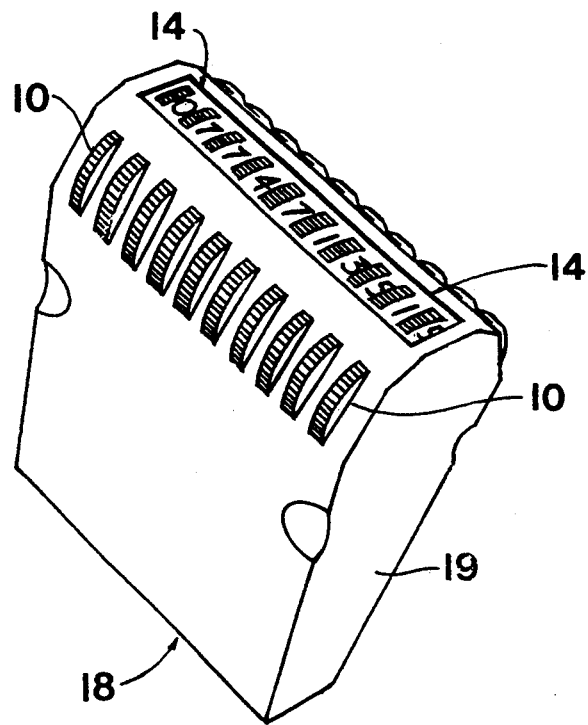
FIG. 1 is a front perspective view of a hand-held personal barcoder unit according to the invention, operable with a thumb wheel control for user selection.
Figure 2:
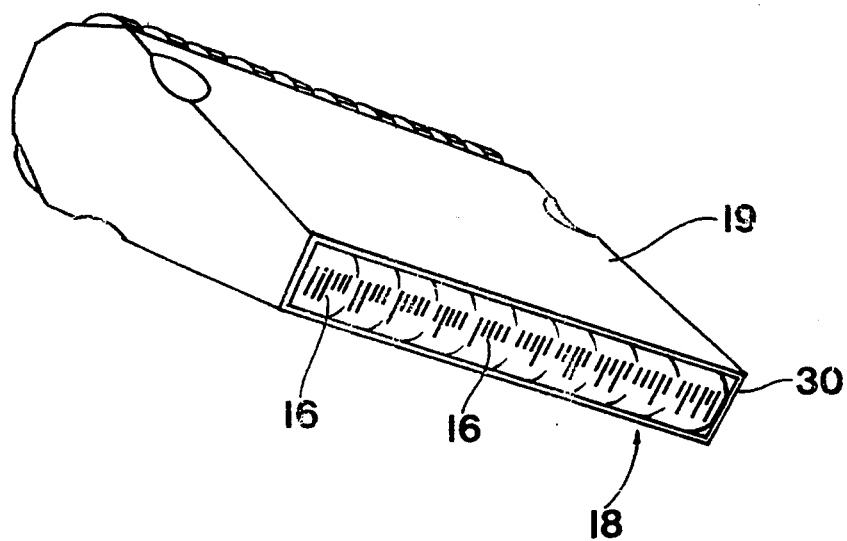
FIG. 2 is a bottom perspective view of the personal barcoder of FIG. 1.

As is well known and understood, a bar code includes a series of tall and short bars corresponding to "1's", and "0's", of a binary code for an analog digit. Table I illustrates the correspondency of the binary code for the numeric digits 0-9, and with the understanding that in the corresponding bar codes, the "1's" are represented by a tall bar and the "0's" are represented by short bars.

TABLE I

| NUMERIC DIGIT | BINARY CODE |
| --- | --- |
| 0 | 11000 |
| 1 | 00011 |
| 2 | 00101 |
| 3 | 00110 |
| 4 | 01001 |
| 5 | 01010 |
| 6 | 01100 |
| 7 | 10001 |
| 8 | 10010 |
| 9 | 10100 |
| (AS UTILIZED BY THE UNITED STATES POSTAL SERVICE) | |

With this character coding, the hand-held unit of the invention will be seen akin to an adjustable rubber stamp to imprint bar codes—representative of Zip-codes, Zip+4 and/or Zip+6—into a machine readable code onto the mail piece before it enters the delivery stream. In such manner, a Zip+4 code such as 07747-1351, will be automatically translated into a series of machine readable binary numbers which the Postal Service automation equipment can use, identifying an address of number, street, city and State to which only a name need be added for the mail piece or parcel to reach its delivery destination for handling by the Letter Carrier knowledgeable as to the recipient's name or firm.

The hand-held personal barcoder unit of FIGS. 1-6 will be understood to incorporate ten thumb wheels 10 for a Zip+4 Postal system. Extending around and between each thumb wheel 10 is a character carrying member in the nature of a continuous band 12 having on an outwardly facing surface the numeric digits 0-9 to be individually brought into display within a window arrangement 14. Through user selection of the individual thumb wheels 10, a Zip code destination (Zip+4) can thus be displayed as 07747-1351, along with a correction character which Postal automation equipment uses to correct smudged or unreadable bar codes. In order for correction character to be employed, the arrangement is for the Postal customer to add up all the digits in Zip+4, and once the total is obtained, to round the number off to the next multiple of ten. The difference between the rounded-off number and the original total is then the correction character that is dialed, or otherwise selected, into the last thumb wheel number. Thus, for Zip+4 of 07747-1351, the added total is 35, to be rounded off to the next multiple of ten, or 40. The difference between these two numbers—5—is the correction character which is programmed into the display window, as indicated. The Zip-code window 14 then displays the destination address of the recipient of the mail. (See FIGS. 1 and 4).

Figure 5:
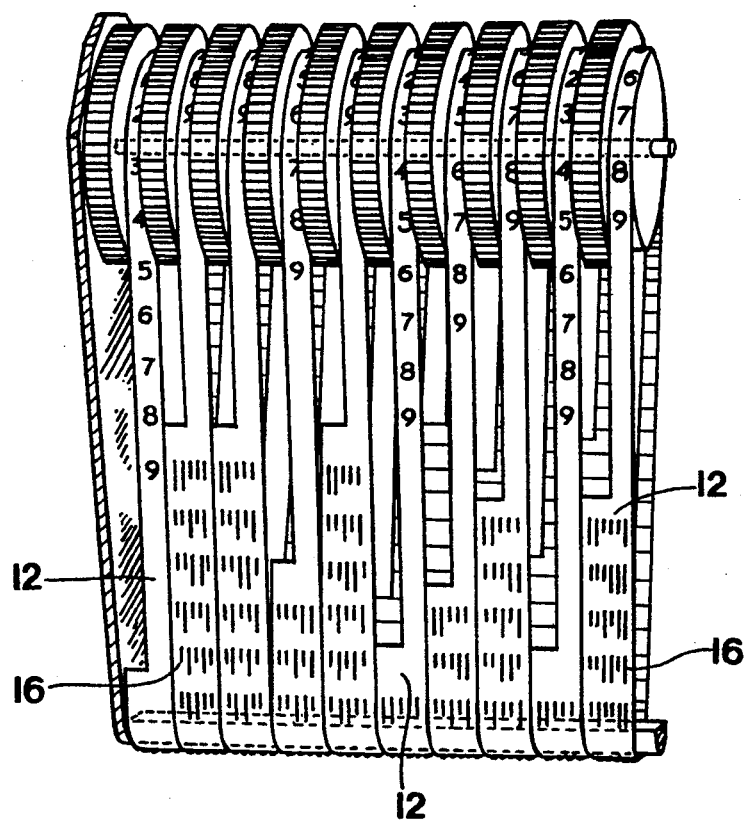
FIG. 5 is a front elevation view of the personal barcoder of FIGS. 1-3, also helpful in an understanding of its operation.
Figure 6:
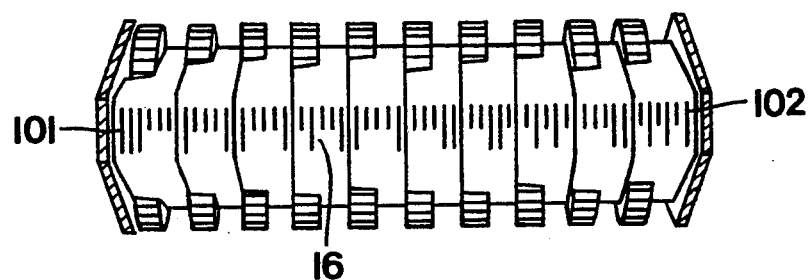
FIG. 6 is a bottom elevation view to supplement those of FIGS. 4 and 5 in explaining the operation of the personal barcoder of FIGS. 1-3.

As also shown in FIGS. 5 and 6, the character carrying bands 12 also incorporate the bar code representations 16 which are positioned on the same outwardly facing surface of the continuous band, and so as to produce at the underside of the hand-held unit 18 the bar code representation which corresponds to the analog digit then displayed through the individual Zip-code windows. FIG. 6, in this respect, shows the alignment of the character carrying band at its underside corresponding to the Zip+4 display of 07747-1351, but with the understanding that there is an additional extra tall bar 101 at the extreme left of the representation, and another one 102 at the extreme right, indicative of the beginning and the end of the destination code representation. Each intervening segment will be seen to carry a bar code representation of the type shown in TABLE I corresponding to the analog numeric digit displayed in the Zip-code window. The body 19 in FIGS. 1-3 will be appreciated to cover the hand-held device of the personal barcoder such that the large wheel numbers 10 of the thumb wheel units protrude through wheel openings there present.

The Zip-code windows 14 at the top allow the Zip-code digits to be aligned and viewed, while the bar code numbers are allowed to extend through the bottom window 30 in permitting the bar code representation to be applied to a piece of mail.

Figure 3:
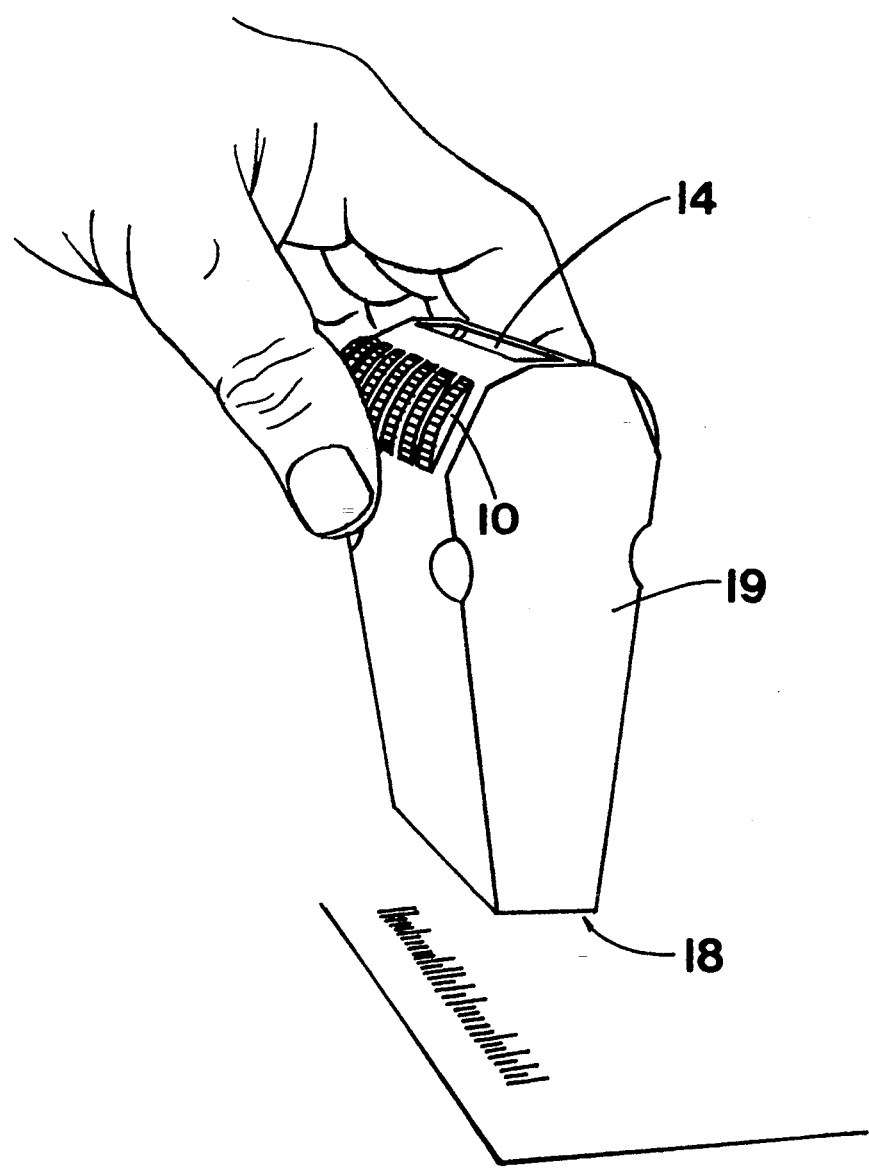
FIG. 3 is a view illustrating the manner by which the personal barcoder of FIGS. 1 and 2 can be employed in a sender's affixing of a bar code to an envelope for mailing.
Figure 4:
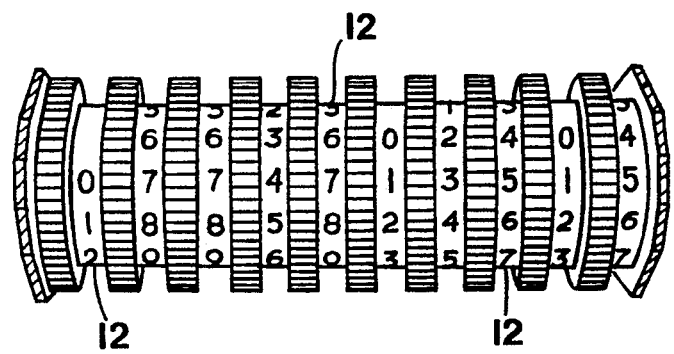
FIG. 4 is a top elevation view helpful in an understanding of the operation of the personal barcoder of FIGS. 1-3, with the cover of the hand-held unit removed.

In such respects, and so as to imprint the bar code representation in the manner shown in FIG. 3, the character carrying continuous band 10 may be constructed of a sturdy rubber or plastic composition, to take the pressing against a stamp pad so as to affix the representation directly to the mail document. Alternatively, and in any appropriate manner, the bar code representations may be pre-inked to be stamped directly. In either event, mechanical actuation of the thumb wheel 10 thus brings the Zip-code display into view, and the corresponding bar code representation into position for stamping.

Figure 7:
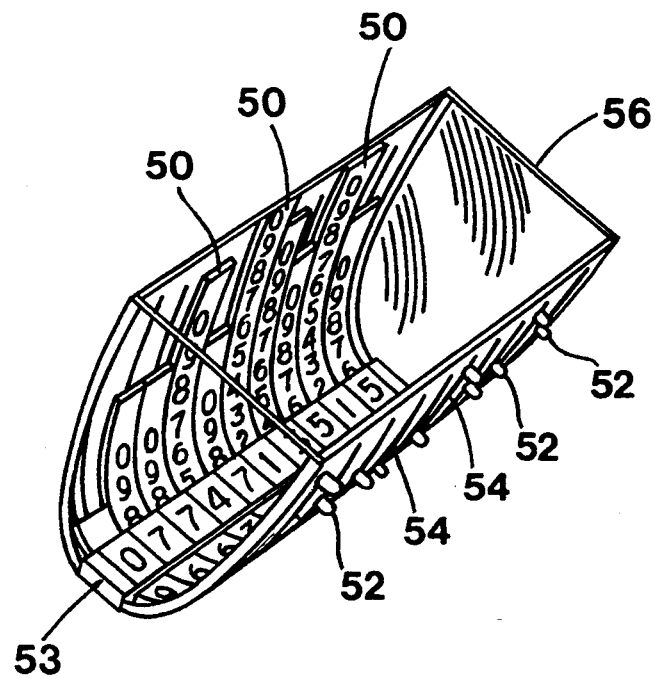
FIG. 7 is a perspective view of another embodiment of a hand-held unit employing the invention when employed with character carrying strips of analog numbers on one side and showing tab control for user selection.
Figure 8:
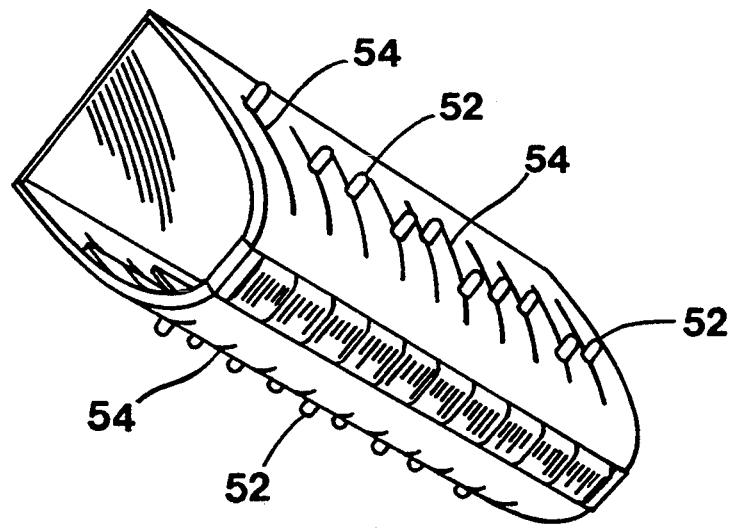
FIG. 8 is a bottom perspective view of the hand-held unit of FIG. 7 helpful in an understanding of the invention, showing the tabs projecting through the body and the bar code representations projecting through the bottom window of the unit.

In the second embodiment of FIGS. 7 and 8, the thumb wheels of FIGS. 1-6 are replaced, as are their continuous character carrying bands which extend about them. In their place, a plurality of character carrying strips are employed 50, which display on one side the analog number, and on the underside of which are imprinted the corresponding bar code representations as appear in TABLE I. The Zip+4 windows are shown as 53, and a series of tabs 52 are employed, each extending through its own slot 54 to allow the strip to be slid into position in displaying the correct analog number, and bringing the bar code representation into position. The body of this hand-held unit is shown at 55, and as illustrated, the tabs 52 may be located on the same side of the strip as the bar code representation. As will be appreciated, the slots 54 in the body 55 allow the tabs 52 to be mechanically adjusted to project through the slots 54 in aligning the Zip-code digits in the windows 53 and corresponding bar code representation on the opposite side of the character carrying strip 50, i.e. under the windows 53. Thus, the tabs 52 allow for the individual strips to be moved so as to accommodate different Zip-code digits and corresponding Postal Service codes. As with the embodiment of FIGS. 1-6, the character carrying strips 50 are mechanically adjusted into position according to user selection, and fabricated of sturdy rubber or plastic so as to allow for imprinting of the bar code on the mail to be sent—either after stamping on a pad, or pre-inked in any appropriate manner (see FIGS. 7 and 8).

Figure 9:
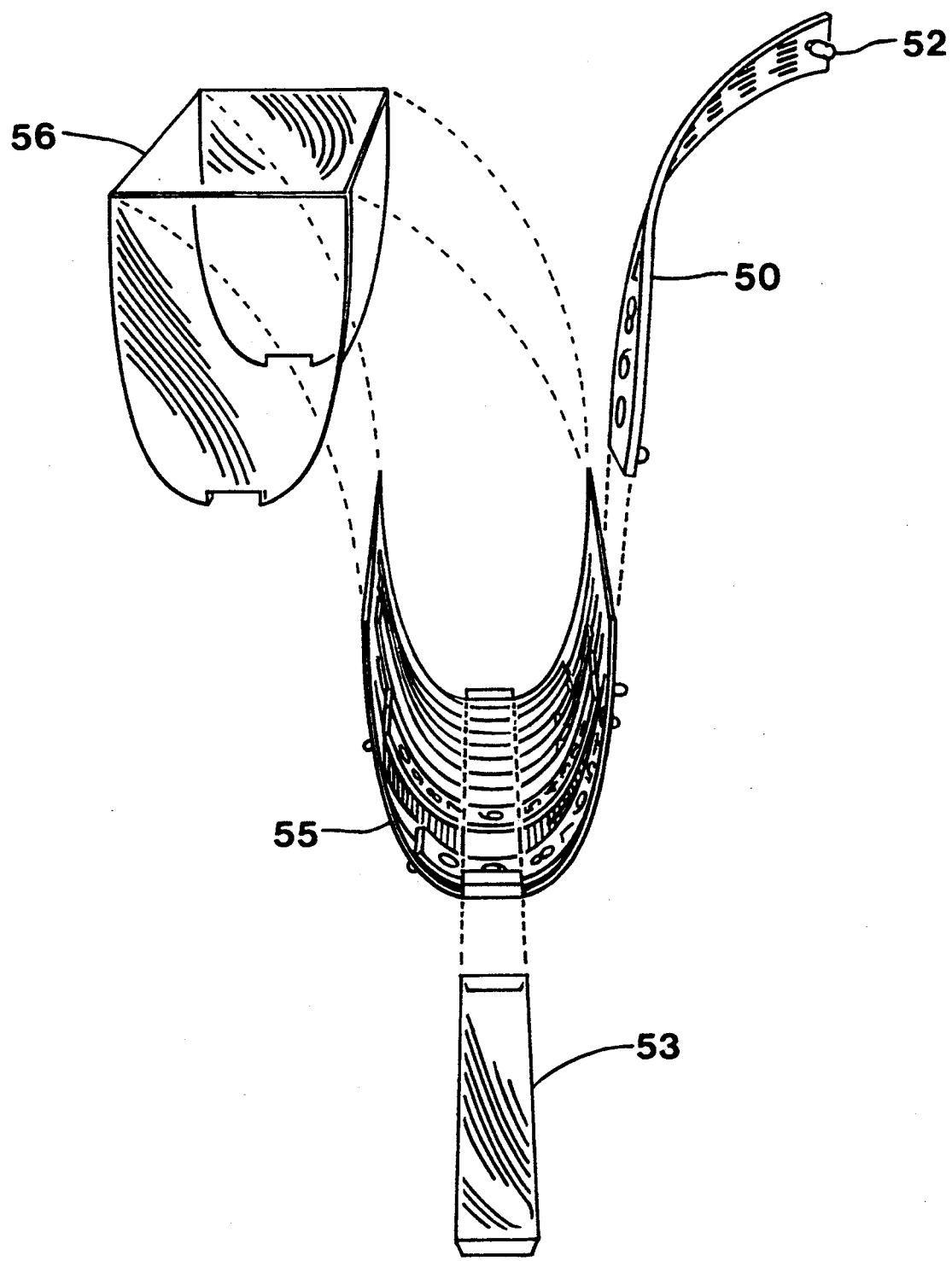
FIG. 9 is an exploded view of the second embodiment, so as to show the individual parts and how they come together. As this figure shows, all the parts come together in such a manner as to allow the inside of the body to be viewed and for the character carrying strips to be moved through the outside of the body.

An exploded view of the second embodiment, FIG. 9, shows how all the individual parts come together to form the unit. The upper body 56, comes together with the main body 55, as shown. The character carrying strips 50, move about and under the clear window 53, by the movement of the tabs 52, and thereby allow for the aligning of the character carting strips 50, and their corresponding Zip-code digits and bar code representations as has previously been mentioned.

As will be readily appreciated, such personal barcoders described can be inexpensive to manufacture, and easy to provide to the general public or the small business person—such as through dissemination at the Post Office window. Being completely portable, it permits the general public and/or the small business person to affix the bar code directly to the mail being sent, so as to achieve the benefits allowed by the Postal Service for pre-bar coding mail in a manner now generally available only to large corporations utilizing such services. In fact, analysis has shown that dissemination of these units at the Post Office—even for free—could very well result in a savings to the Postal Service which by far offsets the cost of the manufacture and dissemination of the hand-held units. Instruction as to their use can, of course, be distributed at such time, also.

While there have been described what are considered to be preferred embodiments of the present invention, it will be readily appreciated by those skilled in the art that modifications can be made without departing from the scope of the teachings herein. Thus, although the invention has been particularly described in a system of Zip+4, it will be seen that its teachings would apply equally as well to a further system under development commonly referred to as Zip+6, to further delineate the destination of intended mail, as by floors in an office complex, and even room numbers on those floors. All that would be needed in such systems is to employ an additional two character bands or strips to those shown in FIGS. 1-8, bringing their numbers from the illustrated "ten" to a total of "twelve", continuing to include the Postal Service correction character.

Furthermore, it will likewise be apparent to those skilled in the art that the invention can also be employed with personal barcoders that have shapes other than as depicted in the drawings—for example, circular, oval, trapezoidal, triangular, etc., with character bands or strips then being moved in different manners than as described, or inked in different colors, if desired.

In addition, those skilled in the art will appreciate that the invention is not limited just for the use in the United States Postal Service, but can also be employed in other manners where bar codes are desirable. Thus, in supermarket situations, where foods and products are received that are not already bar coded for computer reading, the hand-held units of the invention can be employed to affix directly to the product corresponding bar codes other than at the point of original shipping. This is of particular significance where the products or goods are received from foreign markets where bar codes are not employed—and even when received bar coded according to one system, but where translation to another bar code system is required. In other words, although the present invention has been particularly described in the context as to how it can be employed in speeding Postal delivery, and in reducing costs both to the United States Postal Service and to the user as well, the teachings of the present invention can be more generalized, as and where needed. For at least such reasons therefore, resort should be had to the claims appended hereto for a correct understanding of the invention.

We claim:
1. A personal barcoder, comprising:
 a hand-held unit having a housing, said housing having a top, a bottom and side walls, said side walls having a plurality of slots disposed thereon; a longitudinal opening disposed at said bottom of said housing and a clear window strip disposed at said opening;
 a plurality of character carrying members disposed inside said housing, each said character carrying member comprising an elongate and flexible strip having two opposite sides, one side of said flexible strip carrying a plurality of analog numbers and the opposite side of said flexible strip carrying bar code representations of the corresponding analog numbers;
 said flexible strips being selectively slidable longitudinally inside said housing underneath said clear window strip such that when a selected analog number is placed directly underneath said clear window strip, a corresponding bar code representation of said selected analog number is displayed at said opening;
 each said flexible strip having at least one tab disposed thereon and projecting through said slot, said tabs being actuated to display a desired series of analog numbers and position their corresponding bar code representations at said opening for imprinting thereof.

* * * * *